United States Patent
Matsuoka et al.

(10) Patent No.: US 12,491,741 B2
(45) Date of Patent: Dec. 9, 2025

(54) COMPONENT OF SUSPENSION STRUCTURE

(71) Applicant: TOYOTA JIDOSHA KABUSHIKI KAISHA, Toyota (JP)

(72) Inventors: Kazuyuki Matsuoka, Toyota (JP); Ayumi Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/925,859

(22) Filed: Oct. 24, 2024

(65) Prior Publication Data
US 2025/0135819 A1 May 1, 2025

(30) Foreign Application Priority Data
Oct. 30, 2023 (JP) ................. 2023-185924

(51) Int. Cl.
*B60G 7/00* (2006.01)

(52) U.S. Cl.
CPC ............ *B60G 7/001* (2013.01); *B60G 7/005* (2013.01); *B60G 2204/41* (2013.01); *B60G 2204/416* (2013.01); *B60G 2206/73* (2013.01)

(58) Field of Classification Search
CPC .... B60G 7/001; B60G 7/005; B60G 2204/41; B60G 2204/416; B60G 2206/73
See application file for complete search history.

(56) References Cited

U.S. PATENT DOCUMENTS

| | | | | |
|---|---|---|---|---|
| 4,986,566 A | * | 1/1991 | Nishino | B60R 19/00 280/124.145 |
| 5,516,130 A | * | 5/1996 | Mitchell | B60G 7/001 280/124.134 |
| 5,992,867 A | * | 11/1999 | Kato | B60G 7/001 280/124.134 |
| 7,163,219 B2 | * | 1/2007 | Seksaria | B60G 7/001 280/124.133 |
| 7,938,417 B2 | * | 5/2011 | Ersoy | B60G 7/005 280/124.134 |
| 11,072,375 B2 | * | 7/2021 | Darin | B62D 27/026 |
| 2001/0032764 A1 | * | 10/2001 | Hasegawa | F16F 7/108 188/378 |
| 2004/0135337 A1 | * | 7/2004 | Alesso | B60G 7/001 280/124.134 |
| 2010/0086346 A1 | * | 4/2010 | Kruse | B60G 7/001 29/527.4 |
| 2012/0098228 A1 | * | 4/2012 | Wilson | B60G 7/005 280/124.134 |

(Continued)

FOREIGN PATENT DOCUMENTS

| | | | | |
|---|---|---|---|---|
| CN | 104325852 A | * | 2/2015 | ............... B60G 7/02 |
| DE | 102018006808 A1 | * | 3/2019 | .......... B62D 21/152 |

(Continued)

*Primary Examiner* — Paul N Dickson
*Assistant Examiner* — Shams Dhanani
(74) *Attorney, Agent, or Firm* — Oliff PLC

(57) ABSTRACT

Provided is a component of a suspension structure, which can achieve weight reduction while ensuring rigidity. As the component of the suspension structure for a vehicle, a lower arm includes a body made of metal. A reinforcing member that increases a rigidity of the body is securely attached along an edge of the body. The reinforcing member is made of a resin material or a rubber material.

2 Claims, 6 Drawing Sheets

(56) References Cited

U.S. PATENT DOCUMENTS

| | | | |
|---|---|---|---|
| 2012/0315414 A1* | 12/2012 | Wesch | B62D 29/005 |
| | | | 428/34.1 |
| 2018/0111433 A1* | 4/2018 | Compigne | B60G 7/005 |
| 2018/0154718 A1* | 6/2018 | Kwon | F16D 3/22 |
| 2019/0030972 A1* | 1/2019 | Mainz | B60G 7/005 |
| 2019/0061452 A1* | 2/2019 | Lee | B60G 7/001 |
| 2019/0118437 A1 | 4/2019 | Lee et al. | |
| 2019/0315174 A1* | 10/2019 | Kwon | B60G 3/02 |
| 2021/0213795 A1* | 7/2021 | Hoschouer | B60G 7/001 |
| 2021/0229513 A1* | 7/2021 | Seethaler | B60G 7/02 |
| 2022/0048348 A1* | 2/2022 | Meyer | B60G 7/001 |
| 2023/0256784 A1* | 8/2023 | Crosby | B60G 3/20 |
| | | | 280/124.1 |

FOREIGN PATENT DOCUMENTS

| | | | | |
|---|---|---|---|---|
| EP | 3225524 B1 * | 9/2018 | | B62M 9/16 |
| JP | 2001-241496 A | 9/2001 | | |
| JP | 6706325 B2 | 6/2020 | | |
| KR | 20170119235 A * | 10/2017 | | B60G 7/005 |
| KR | 20190142666 A * | 12/2019 | | B60G 7/005 |

\* cited by examiner

COMPONENT OF SUSPENSION STRUCTURE

CROSS REFERENCE TO RELATED APPLICATIONS

The present application claims priority from Japanese patent application JP 2023-185924 filed on Oct. 30, 2023, the entire content of which is hereby incorporated by reference into this application.

BACKGROUND

Technical Field

The present disclosure relates to a component of a suspension structure for a vehicle.

Background Art

Conventionally, a metal material is used for a component of a suspension structure for a vehicle. For example, JP 6706325 B discloses a lower arm that couples a vehicle wheel and a suspension member. The body of the lower arm is made of metal, and the body includes side walls that rise from the peripheral edge of the body to surround the peripheral edge. In an inner space surrounded by the side walls, a rib-shaped insert made of resin is formed to pass over the adjacent side walls.

SUMMARY

However, in the component such as the lower arm shown in JP 6706325 B, the rib-shaped resin insert is inserted into the inner space surrounded by the side walls. This means that a space is required for the insert to be disposed inside of the component, which makes it difficult to ensure the rigidity of the component while making the component smaller in size (lighter in weight).

The present disclosure has been made in view of the foregoing, and provides a component of a suspension structure, which can achieve weight reduction while ensuring rigidity.

In view of the foregoing, the present disclosure is a component of a suspension structure for a vehicle. The component includes a body made of metal. A reinforcing member that increases a rigidity of the body is securely attached along an edge of the body. The reinforcing member is made of a resin material or a rubber material.

According to the present disclosure, since the reinforcing member that increases the rigidity of the body is securely attached to the edge of the body, the edge that tends to deform, among portions of the component, is reinforced. Consequently, it is possible to achieve weight reduction while efficiently ensuring the rigidity of the component.

In some embodiments, the body includes a recessed groove along the edge, and the reinforcing member is securely attached to the recessed groove to fill the recessed groove. According to this embodiment, by providing the edge with the recessed groove, the recessed groove can have the reinforcing member bound thereto. Further, when the entire body tends to deform due to a load acting on the body, the recessed groove tends to deform in the width direction. However, in this embodiment, since the recessed groove is filled (charged) with the reinforcing member, deformation of the recessed groove can be suppressed. In particular, in a portion that tends to deform such that the groove width of the recessed groove becomes smaller, a compressive stress acts on the reinforcing member. Thus, it is possible to effectively suppress such deformation of the recessed groove. By suppressing the deformation of the recessed groove, deformation of the body can be suppressed.

In some embodiments, the component is a lower arm that couples a vehicle wheel and a suspension member. The body of the lower arm includes a first coupling portion coupled to the vehicle wheel via a ball joint, and a second coupling portion and a third coupling portion attached to the suspension member via bushes at opposite ends in a front-rear direction of the vehicle. The edge of the body includes a first edge linking the first coupling portion and the second coupling portion, a second edge linking the second coupling portion and the third coupling portion, and a third edge linking the third coupling portion and the first coupling portion. A first recessed groove is formed along the first edge, a second recessed groove is formed along the second edge, and a third recessed groove is formed along the third edge. The reinforcing member is securely attached to each of the first recessed groove, the second recessed groove, and the third recessed groove.

According to this embodiment, at the time of acceleration and deceleration of the vehicle, and at the time of turn of the vehicle, the second coupling portion and the third coupling portion attached to the suspension member serve as bound portions, and a load acts on the first coupling portion coupled to the vehicle wheel. Consequently, a bending moment acts on the entire lower arm. Such a bending moment causes the lower arm to tend to deform, and accordingly the first recessed groove, the second recessed groove, and the third recessed groove tend to deform in the width direction. However, since these recessed grooves are filled (charged) with the reinforcing members, the deformation of the recessed grooves can be suppressed. Thus, the deformation of the lower arm can be suppressed.

In some embodiments, the body is a press molded body formed by press-forming a metal plate, and forming a protrusion on one surface of the body allows the recessed groove to be formed on another surface of the body.

According to this embodiment, when the body of the component is formed by press-forming, the thickness of the component can be reduced and the weight reduction can be achieved as compared to a component formed through casting. Meanwhile, since a protrusion is formed on one surface of the body and a recessed groove is formed on another surface of the body, it is possible to effectively increase the rigidity of the component.

According to the present disclosure, it is possible to achieve weight reduction while ensuring rigidity.

DETAILED DESCRIPTION

Figure 1:
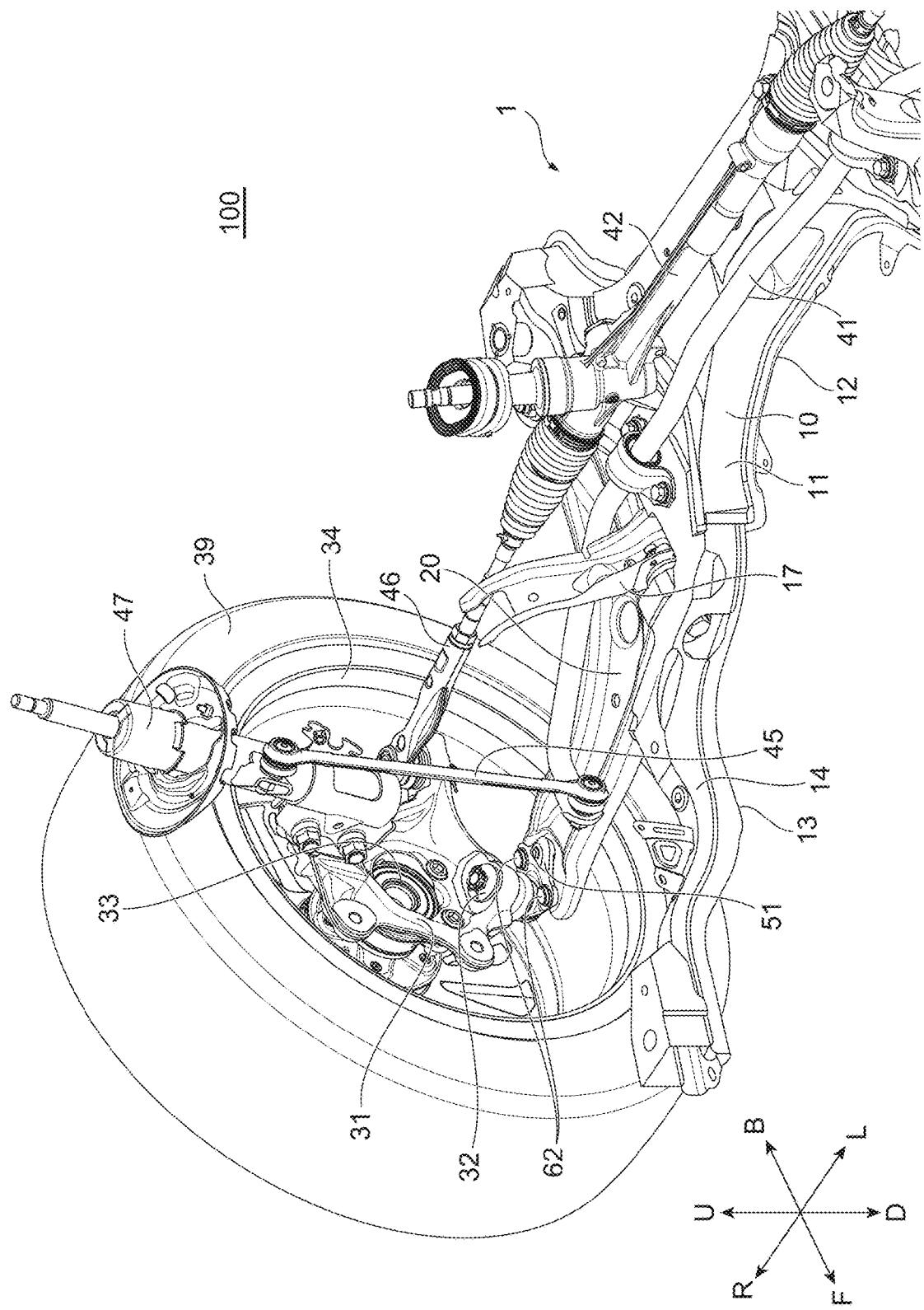
FIG. 1 is a schematic perspective view around a right front vehicle wheel of a vehicle, including a plurality of components of a suspension structure according to an embodiment.

Hereinafter, referring to FIG. 1 to FIG. 6, a component of a suspension structure for a vehicle will be described. It is noted that in FIG. 1 to FIG. 5, the reference numeral "U" denotes an upward direction of the vehicle, and the reference numeral "D" denotes a downward direction of the vehicle. The reference numeral "F" denotes the front side of the vehicle, and the reference numeral "B" denotes the rear side of the vehicle. Further, the reference numeral "R" denotes the right side of the vehicle, and the reference numeral "L" denotes the left side of the vehicle. In the following description, the term "vehicle width direction" may include directions along the reference numeral R and the reference numeral L, and the term "vehicle length direction" may include directions along the reference numeral "F" and the reference numeral "B."

As illustrated in FIG. 1, a vehicle 100 such as an automobile is provided with a suspension structure 1 of a strut type. FIG. 1 illustrates the suspension structure 1 that supports a vehicle wheel 39 on the right front side of the vehicle 100. The suspension structure 1 includes a shock absorber 47 made up of a dumber and a coil spring (not illustrated), and a suspension member 10 that extends in the left-right direction of the vehicle 100 and is secured to a vehicle body (not illustrated). Further, the suspension structure 1 includes a lower arm 20 coupled to the suspension member 10, on the outer side in the vehicle width direction of the suspension member 10.

The shock absorber 47 is secured to a knuckle 31. The knuckle 31 supports a wheel 34 of the vehicle wheel 39 via a hub bearing 33 such that the vehicle wheel 39 is rotatable. The hub bearing 33 supports a driveshaft (not illustrated). A brake device is attached to the hub bearing 33 via a hub 36 (see FIG. 2).

The suspension member 10 includes center members 11, 12 disposed at the center of the vehicle 100 in the width direction and disposed to be stacked in the up-down direction, and side members 13, 14 disposed to be stacked in the up-down direction, at each of the opposite sides of the center members 11, 12 in the vehicle width direction. The lower arm 20 is coupled to the suspension member 10. The lower arm 20 supports the vehicle wheel (steering wheel) 39 for the steering of the vehicle 100 via a ball joint 32 attached to the knuckle 31.

To the knuckle 31, a tie rod 46 extending from a steering device 42 mounted on the vehicle body (not illustrated) is connected, which allows the rotational operation of the vehicle wheel 39. To the suspension member 10, a stabilizer 41 extending along the vehicle width direction is attached. The end of the stabilizer 41 is coupled to the shock absorber 47 via a stabilizer link 45.

Hereinafter, the lower arm 20 will be described as a component of the suspension structure 1 for the vehicle 100. The lower arm 20 includes a body 21 made of metal. Reinforcing members 28A to 28C that increase the rigidity of the body 21 are securely attached to the lower arm 20 along edges 20a to 20c of the body 21. The reinforcing members 28A to 28C are made of a resin material or a rubber material.

Figure 2:
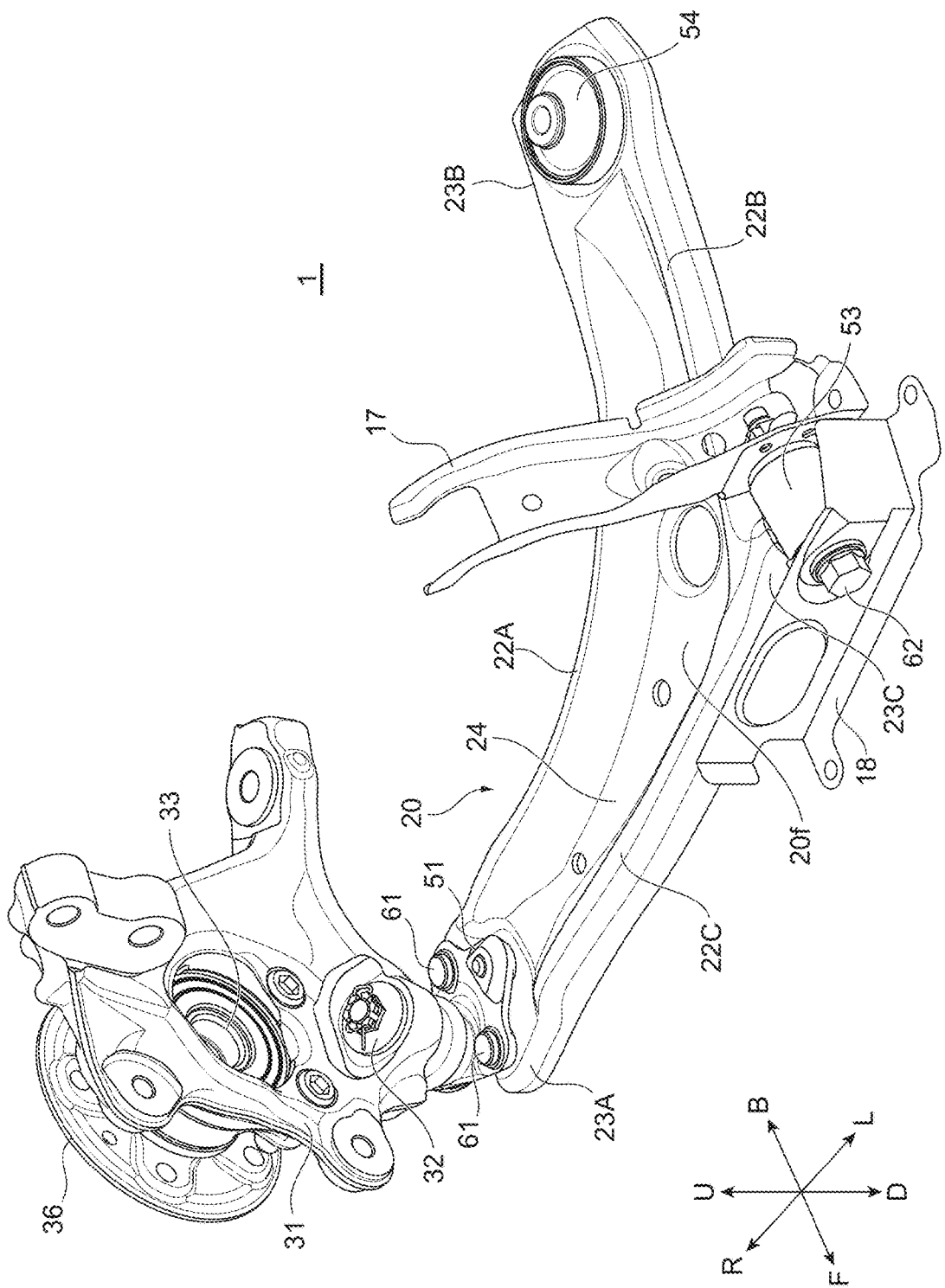
FIG. 2 is a schematic perspective view of a lower arm in a connected state among the plurality of components of the suspension structure illustrated in FIG. 1.

More specifically, as illustrated in FIG. 1 and FIG. 2, the lower arm 20 is a member that couples the vehicle wheel 39 (or the knuckle 31 attached to the wheel 34 of the vehicle wheel 39) and the suspension member 10. In the present embodiment, the body 21 of the lower arm 20 is a press molded article formed by press-forming a metal plate such as a steel plate or an aluminum plate.

Figure 3A:
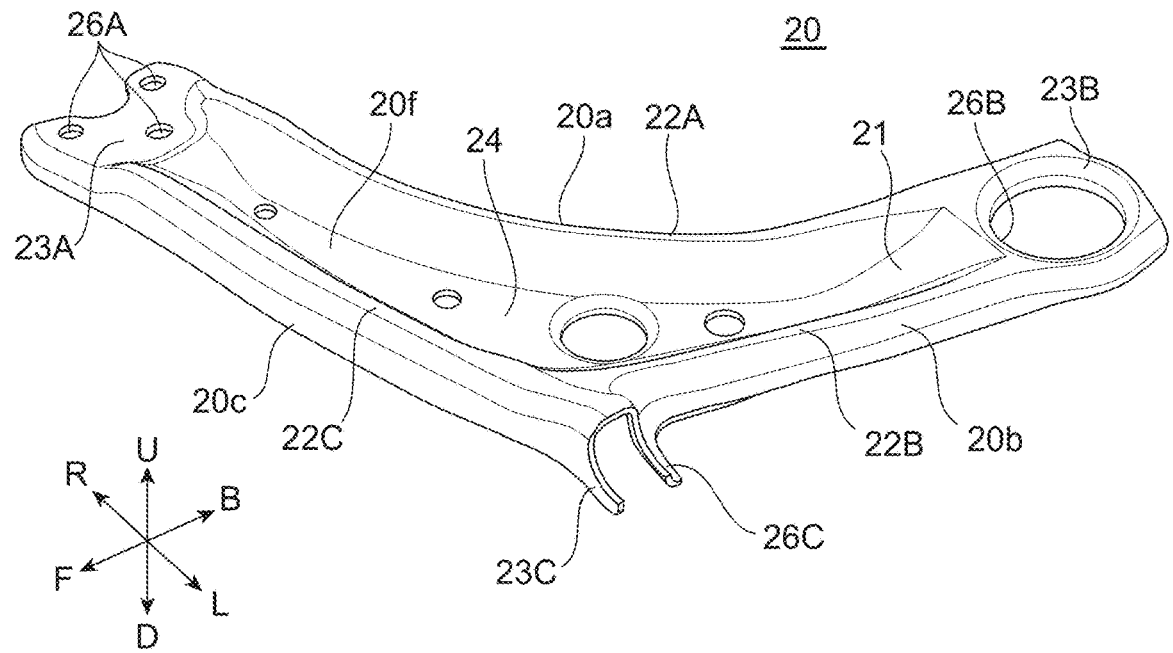
FIG. 3A is a schematic perspective view of the lower arm in an oblique top view.

Specifically, as illustrated in FIG. 2 and FIG. 3A, the lower arm 20 is an L-shaped member, and includes first to third coupling portions 23A to 23C. The first coupling portion 23A is coupled to the knuckle 31 attached to the wheel 34 of the vehicle wheel 39 via the ball joint 32. The first coupling portion 23A has an attachment hole 26A. In a state where a fastener 61, such as a screw, is inserted through the attachment hole 26A, a bracket 51 is secured to the lower arm 20. The knuckle 31 and the bracket 51 are coupled together via the fastener 61.

The second coupling portion 23B and the third coupling portion 23C are attached to the suspension member 10 via a first bush 54 and a second bush 53, respectively, at the opposite ends in the front-rear direction of the vehicle 100. The second coupling portion 23B is formed closer to the rear side B than the third coupling portion 23C in the vehicle length direction of the vehicle 100. The third coupling portion 23C is formed closer to the inner side than the first coupling portion 23A in the vehicle width direction of the vehicle 100.

The second coupling portion 23B has an attachment hole 26B, through which the first bush 54 is inserted. By inserting a fastener (not illustrated) through an insertion hole formed in the first bush 54, the second coupling portion 23B is coupled to the suspension member 10.

Additionally, as illustrated in FIG. 2, attachment members 17, 18 to be attached to the vehicle body are secured to the suspension member 10 via the second bush 53 made of a rubber material, which will be described later. The third coupling portion 23C includes a support claw 26C, and in a state where the cylindrical second bush 53 extending along the front-rear direction of the vehicle 100 is sandwiched between the attachment members 17, 18 by a fastener 62, such as a hexagon head bolt, the third coupling portion 23C of the lower arm 20 is coupled to the suspension member 10.

As illustrated in FIG. 3A, in the present embodiment, the body 21 of the lower arm 20 includes edges, that is, a first edge 20a to a third edge 20c. Specifically, the first edge 20a is the edge linking the first coupling portion 23A and the second coupling portion 23B. The second edge 20b is the edge linking the second coupling portion 23B and the third coupling portion 23C. The third edge 20c is the edge linking the third coupling portion 23C and the first coupling portion 23A. The first edge 20a includes an edge portion extending in the vehicle width direction (the left-right direction of the vehicle 100), and a portion extending in the vehicle length direction (the front-rear direction of the vehicle 100). The first edge 20a is curved in an L-shape as view in the up-down direction.

Of the first edge 20a, the edge portion formed along the vehicle length direction, and the second edge 20b are formed to sandwich a flat plate portion 24 of the body 21. Of the first edge 20a, the edge portion formed along the vehicle width direction, and the third edge 20c are formed to sandwich the flat plate portion 24 of the body 21.

Figure 3B:
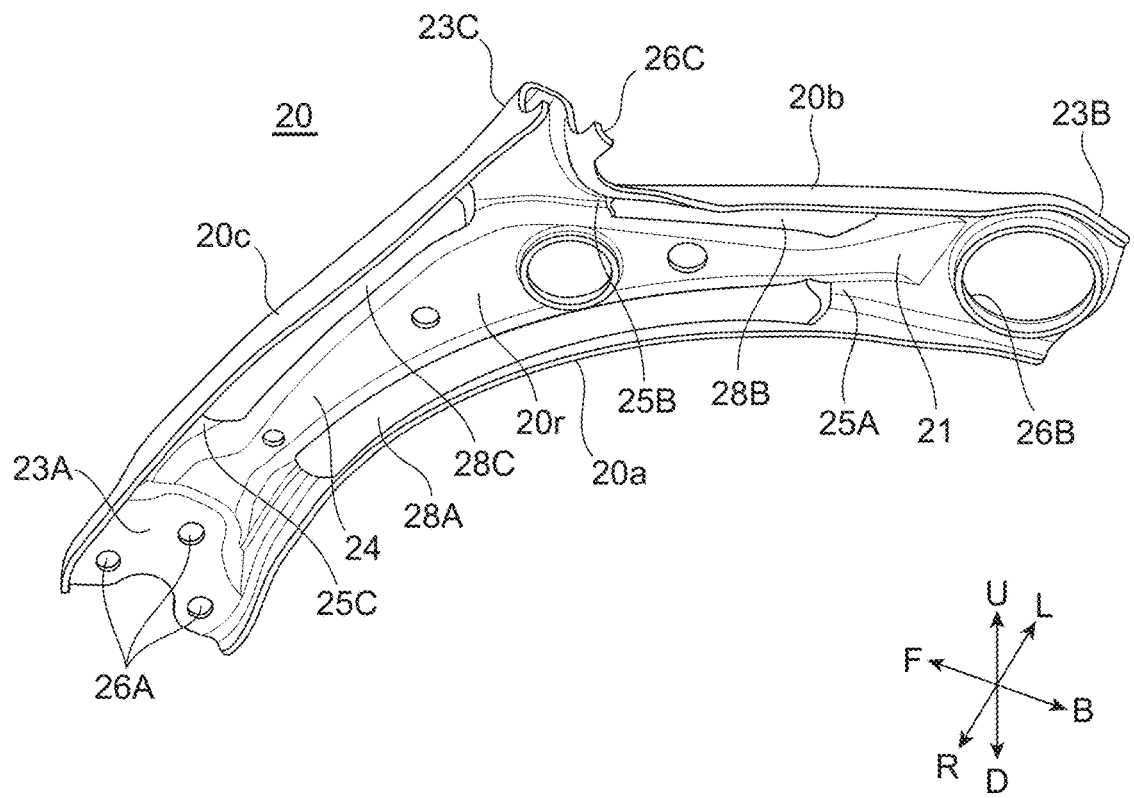
FIG. 3B is a schematic perspective view of the lower arm in an oblique bottom view.

In the present embodiment, as illustrated in FIG. 3B, one surface (rear surface) 20r of the body 21 includes a first recessed groove 25A formed along the first edge 20a, a second recessed groove 25B formed along the second edge 20b, and a third recessed groove 25C formed along the third edge 20c. In the present embodiment, the body 21 is a press molded body formed by press-forming a metal plate, and as illustrated in FIG. 3A, the other surface 20f of the body 21 includes first to third protrusions 22A to 22C. Consequently, as illustrated in FIG. 3B, the one surface 20r of the body 21 includes the first to third recessed grooves 25A to 25C corresponding to the first to third protrusions 22A to 22C, respectively.

On the other surface 20f, the first to third protrusions 22A to 22C protrude from the surface of the flat plate portion 24 surrounded by the first to third edges 20a to 20c, in the thickness direction of the flat plate portion 24. On the one surface 20r, the first to third recessed grooves 25A to 25C are recessed with respect to the surface of the flat plate portion 24 surrounded by the first to third edges 20a to 20c, in the thickness direction of the flat plate portion 24.

Figure 4:
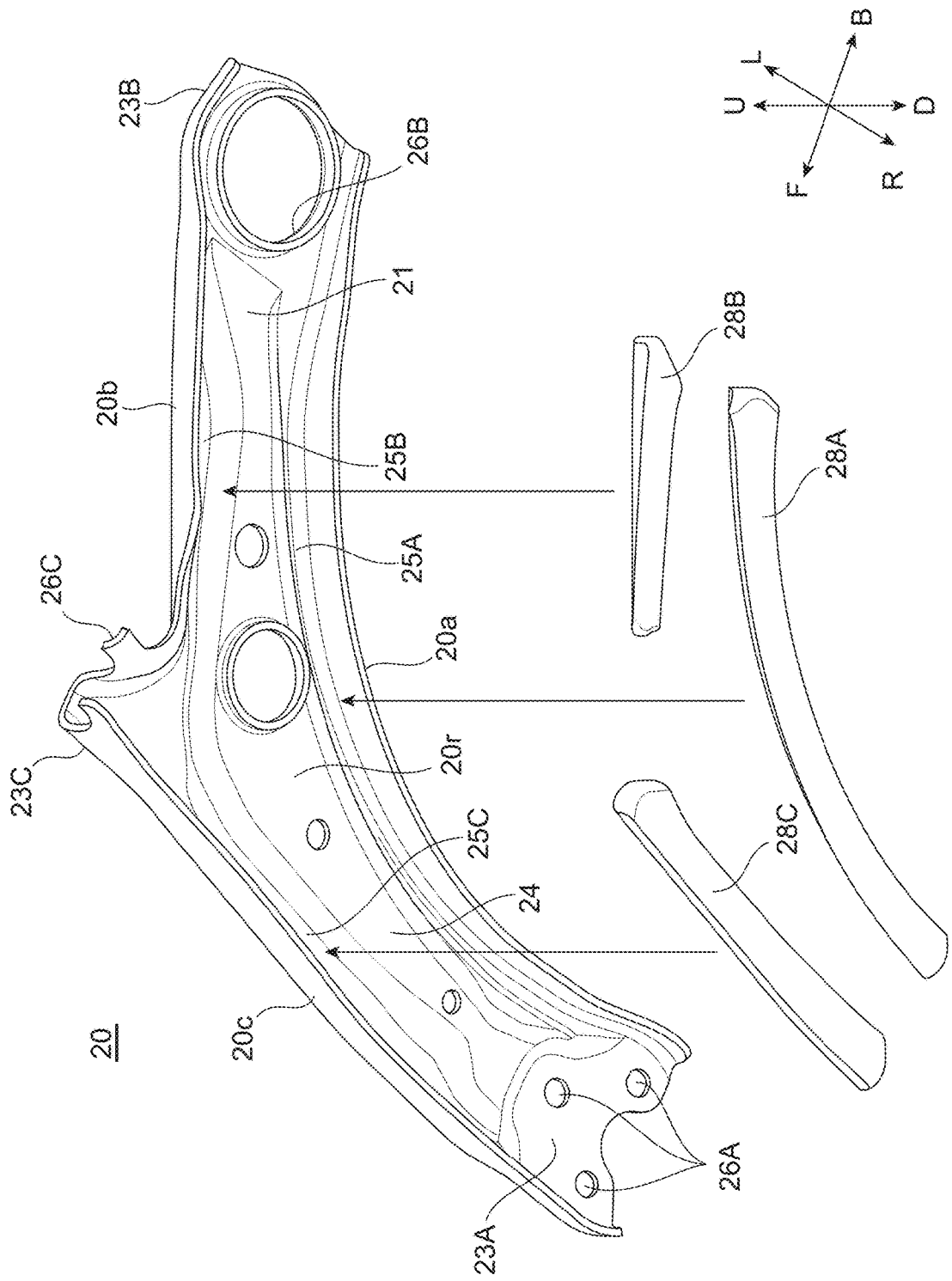
FIG. 4 is a perspective view illustrating a positional relationship between a body of the lower arm illustrated in FIG. 3B and reinforcing members.

As illustrated in FIG. 4, the first to third reinforcing members 28A to 28C are securely attached to the first recessed groove 25A, the second recessed groove 25B, and the third recessed groove 25C, respectively, to fill these grooves. The first to third reinforcing members 28A to 28C are made of a resin material or a rubber material. The resin material or the rubber material is not particularly limited as long as the body 21 of the lower arm 20 can have an increased rigidity. Examples of the resin material include a resin material such as an epoxy resin or an urethane resin. Examples of the rubber material include a hard rubber such as acrylonitrile-butadiene rubber (NBR), nitrile rubber (NR), chloroprene rubber (CR), urethane rubber, or acrylic rubber. The first to third reinforcing members 28A to 28C are made of a hardening material such as a bake hardening material, a two-part hardening material, a moisture hardening material, or the like. The first to third reinforcing members 28A to 28C may be obtained by first applying a pasted coating material serving as a material for the first to third reinforcing members 28A to 28C to the first recessed groove 25A, the second recessed groove 25B, and the third recessed groove 25C and then allowing the coating material to cure. In addition, the coating material may be foamed at the timing of curing.

As long as the first to third reinforcing members 28A to 28C are securely attached to the wall surface of the first to third recessed grooves 25A to 25C of the body 21, a securely attached state is not particularly limited. However, a rust-preventive coating (not illustrated) may be formed on the body 21, and this coating and the first to third reinforcing members 28A to 28C are allowed to hydrogen bond at a molecular level, such that they are securely attached to each other. As another method, a coupling agent may be applied between the first to third reinforcing members 28A to 28C and the wall surface of the first to third recessed grooves 25A to 25C of the body 21, such that they are securely attached to each other.

In this manner, since the first to third reinforcing members 28A to 28C that increase the rigidity of the body 21 are securely attached to the first to third edges 20a to 20c of the body 21 of the lower arm 20, the edges 20a to 20c, which are portions of the lower arm 20 that tend to deform, can be reinforced. Consequently, it is possible to achieve weight reduction while efficiently ensuring the rigidity of the lower arm 20. In particular, since the body 21 of the lower arm 20 is a press molded article, the thickness of the lower arm 20 may be reduced as compared to a lower arm formed through casting. This allows such an effect to be produced more readily. Furthermore, since the other surface 20f of the body 21 includes the first to third protrusions 22A to 22C, it is possible to effectively increase the rigidity of the lower arm 20.

Figure 5:
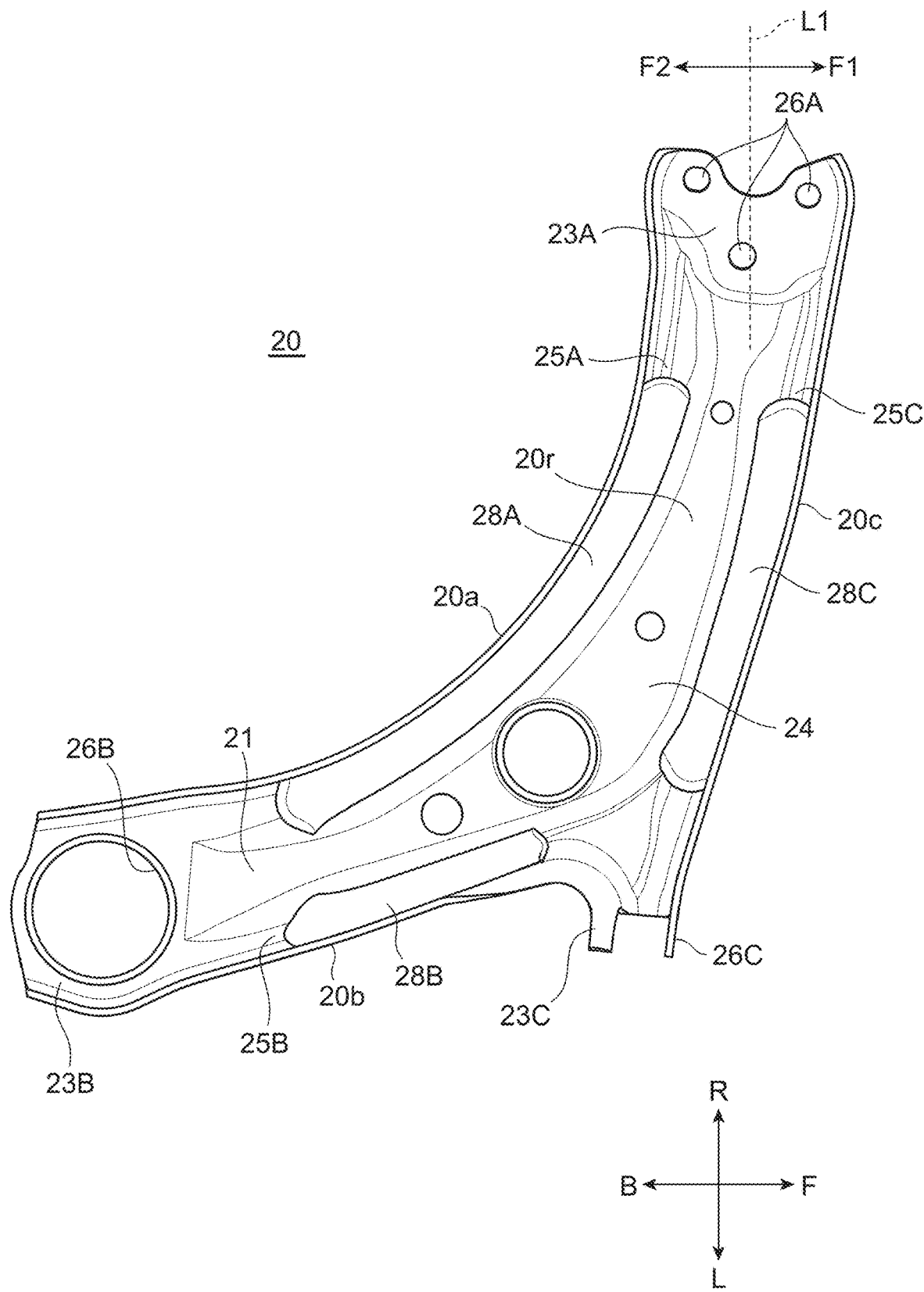
FIG. 5 illustrates the lower arm of FIG. 3B in a plan view for describing a load acting on the lower arm.

Furthermore, as illustrated in FIG. 5, at the time of acceleration and deceleration of the vehicle 100, and at the time of turn of the vehicle 100, the second coupling portion 23B and the third coupling portion 23C serve as portions bound to the suspension member 10 and the vehicle body, and a load acts on the first coupling portion 23A coupled to the vehicle wheel 39. For example, as illustrated in FIG. 5, at the time of acceleration of the vehicle 100, a load F1 acts toward the front side F at the position of a virtual line L1 running through the first coupling portion 23A along the vehicle width direction. Meanwhile, at the time of deceleration of the vehicle 100, a load F2 acts toward the rear side B at the position of the virtual line L1. In either of the cases, with these loads F1, F2, a bending moment acts on the entire lower arm 20. Such a bending moment causes the lower arm 20 to tend to deform, and accordingly the first recessed groove 25A, the second recessed groove 25B, and the third recessed groove 25C tend to deform in the groove width direction.

However, since the first to third recessed grooves 25A to 25C are filled (charged) with the first to third reinforcing members 28A to 28C, the deformation of the first to third recessed grooves 25A to 25C can be suppressed. Thus, the deformation of the lower arm 20 can be suppressed.

In particular, at the time of acceleration, even if the lower arm 20 tends to deform due to the load F1 such that the groove width of the portion of the first recessed groove 25A along the vehicle width direction becomes smaller, such deformation can be suppressed by the portion of the first reinforcing member 28A along the vehicle width direction. At the time of deceleration, even if the lower arm 20 tends to deform due to the load F2 such that the groove width of the second recessed groove 25B becomes smaller, such deformation can be suppressed by the second reinforcing member 28B. Likewise, at the time of turn of the vehicle 100, even if the lower arm 20 tends to deform such that that is a change in the groove width of the portion of the first recessed groove 25A along the vehicle length direction and the groove width of the third recessed groove 25C, such deformation can be suppressed by the portion of the first reinforcing member 28A along the vehicle length direction and the third reinforcing member 28C.

Figure 6:
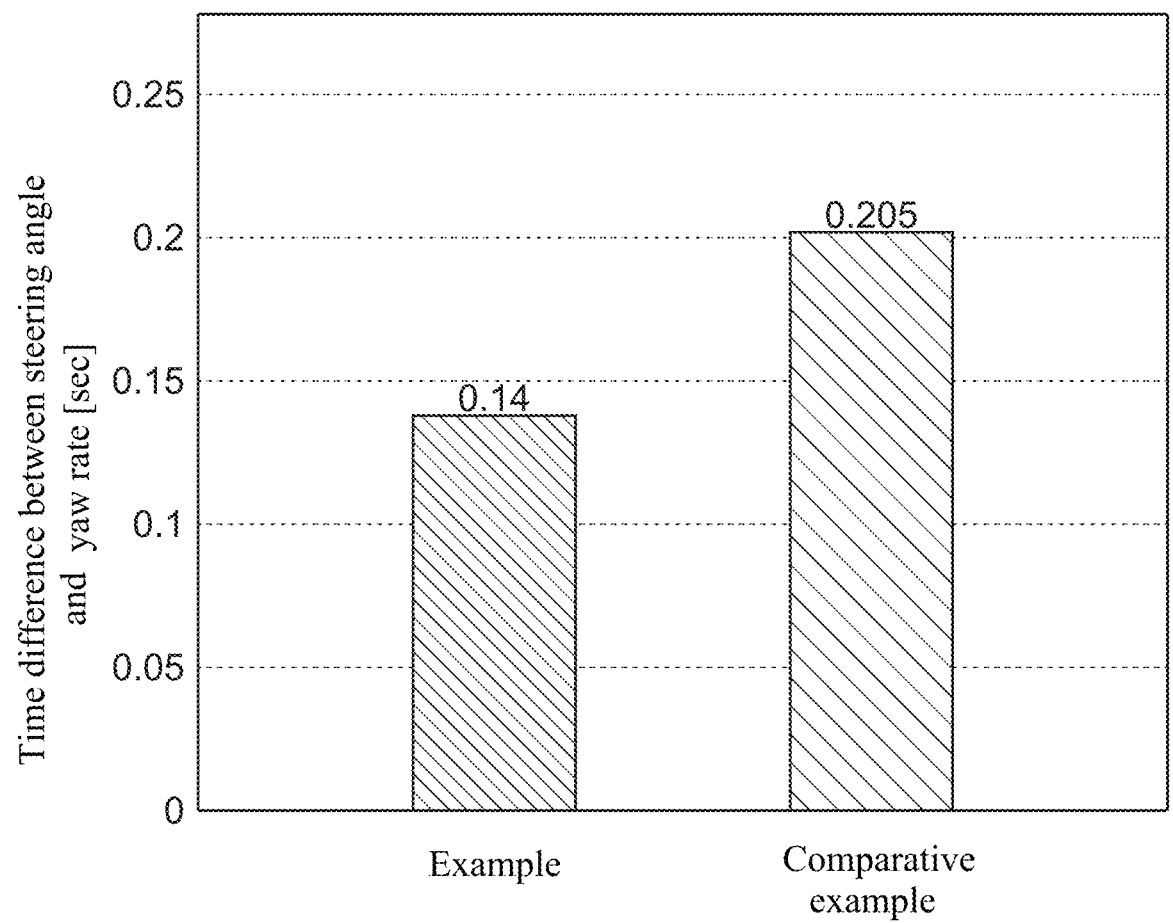
FIG. 6 illustrates a measurement result of a time difference between a steering angle and a yaw rate when the lower arm according to an example and a comparative example is used.

Here, the inventors prepared lower arms for an example and a comparative example. In the example, the lower arm 20 according to the present embodiment was used. In the comparative example, in contrast to the lower arm of the example, a lower arm including only the body 21, without the first to third reinforcing members 28, was used. As illustrated in FIG. 6, the lower arm of the example and the lower arm of the comparative example were mounted on the vehicle, and a time difference between the steering angle and the yaw rate was measured. As a result, the lower arm of the example had a shorter time difference between the steering angle and the yaw rate than in the comparative example. It can be said that the vehicle 100 equipped with the lower arm 20 of the example has a higher operability of the steering wheel than in the comparative example. It is considered that this is because the first to third reinforcing members 28A to 28C increased rigidity of the lower arm 20.

Although the embodiment of the present disclosure has been described in detail above, the present disclosure is not limited to the foregoing embodiment, and various design changes are possible in so far as they are within the spirit of the present disclosure in the scope of the claims.

In the present embodiment, by way of example, the lower arm 20 of the suspension structure 1 has been described as a component of the present disclosure. However, for example, the component (the center members 11, 12, the side members 13, 14) of the suspension member 10 may be provided with a similar reinforcing member. Meanwhile, although the suspension structure 1 of the strut type has been described by way of example in the present embodiment, the suspension structure 1 may be, for example, a suspension structure for a double wishbone type suspension. In this case, a configuration similar to the configuration of the lower arm of the present embodiment may be applied also to an upper arm, in addition to the lower arm. Further, in the present embodiment, the suspension structure 1 for the front wheel has been described by way of example. However, it is needless to mention that a similar configuration may be applied to the suspension structure for the rear wheel, for example.

What is claimed is:

1. A component of a suspension structure for a vehicle,
    wherein the component is a lower arm that couples a vehicle wheel and a suspension member,
    wherein the lower arm includes a body made of metal,
    wherein the body includes
    a first coupling portion coupled to the vehicle wheel via a ball joint, and
    a second coupling portion and a third coupling portion attached to the suspension member via bushes at opposite ends in a front-rear direction of the vehicle,
    wherein the body includes a first edge linking the first coupling portion and the second coupling portion, a second edge linking the second coupling portion and the third coupling portion, and a third edge linking the third coupling portion and the first coupling portion,
    wherein a first protrusion on one surface of the body along the first edge allows a first recessed groove to be formed along the first edge on another surface of the body,
    wherein a second protrusion on the one surface of the body along the second edge allows a second recessed groove to be formed along the second edge on the other surface of the body,
    wherein a third protrusion on the one surface of the body along the third edge allows a third recessed groove to be formed along the third edge on the other surface of the body,
    wherein the body includes a flat plate portion,
    wherein on the one surface of the body, the first protrusion to the third protrusion protrude from a surface of the flat plate portion surrounded by the first edge to the third edge, in a thickness direction of the flat plate portion, on the other surface, the first recessed groove to the third recessed groove are recessed with respect to the surface of the flat plate portion surrounded by the first edge to the third edge, in the thickness direction of the flat plate portion, and
    wherein a reinforcing member that increases a rigidity of the body is securely attached to the body to fill only the first recessed groove, the second recessed groove, and the third recessed groove, the reinforcing member being made of a resin material or a rubber material.

2. The component of the suspension structure according to claim 1,
    wherein the body is a press molded body formed by press-forming a metal plate.

* * * * *